106-84 AU 113 EX
9/18/79 XR 4,168,177

United States Patent [19]

Indelicato et al.

[11] 4,168,177

[45] Sep. 18, 1979

[54] REFRACTORY GUNNING COMPOSITION

[75] Inventors: Bernard A. Indelicato, Bethlehem; William C. Books, Hellertown; Joseph E. Snyder, Bethlehem, all of Pa.

[73] Assignee: Bethlehem Steel Corporation, Bethlehem, Pa.

[21] Appl. No.: 873,465

[22] Filed: Jan. 30, 1978

Related U.S. Application Data

[63] Continuation of Ser. No. 784,876, Apr. 4, 1977, abandoned.

[51] Int. Cl.$^2$ .......... C04B 35/04
[52] U.S. Cl. .......... 106/62; 106/84
[58] Field of Search .......... 106/58, 84, 62

[56] References Cited

U.S. PATENT DOCUMENTS 3,193,402 7/1965 Rusoff et al. .......... 106/58

FOREIGN PATENT DOCUMENTS 963720 7/1964 United Kingdom .......... 106/84

*Primary Examiner*—James Poer
*Attorney, Agent, or Firm*—Joseph J. O'Keefe; John J. Selko

[57] ABSTRACT

A dry-nozzle gunning refractory composition consisting essentially of magnesia grains from crushed used refractory bricks, sodium bentonite clay, and a binder consisting essentially of a mixture of anhydrous sodium silicate particles and hydrated sodium silicate particles.

8 Claims, 1 Drawing Figure

REFRACTORY GUNNING COMPOSITION

This is a continuation of application Ser. No. 784,876, filed Apr. 4, 1977, now abandoned.

BACKGROUND OF THE INVENTION

This invention relates to refractories and particularly refractories adapted for application by the gunning technique.

Metallurgical furnaces such as electric arc furnaces and basic oxygen vessels have utilized basic refractories having high magnesia (MgO) content. Hot repair of the refractories of such basic metallurgical furnaces is commonly done by gunning wet spray mix refractory compositions high in magnesia grain content onto the surfaces to be patched. Such refractory compositions require a binder in order to help the material set up. Various prior art binders have included phosphates, clay and water-soluble alkali metal silicates.

A common prior art binder is commonly supplied as solid particles of water-soluble sodium silicate in the hydrated form. Because such silicate includes chemically-bound water, i.e., water of crystallization, it dissolves in water very quickly.

Another water-soluble silicate binder commonly used is solid sodium silicate in the anhydrous form, i.e., without water of crystallization.

A common gunning practice is to force the refractory composition through a gunning apparatus nozzle and mix the composition with water at the nozzle to form a wet spray mix, which deposits on the refractory wall being repaired. This method is referred to as "dry-nozzle gunning".

One requirement of refractory gunning compositions is that the spray mix must adhere to the wall with minimal "rebound". A second requirement is that the spray mix must set up quite rapidly to a self-supporting condition. In other words, the wet spray mix as it is placed on the furnace wall must not be so plastic as to fall off or "slump" under its own weight. We believe that the tendency of the spray mix to slump is related to a decrease in the viscosity of the wet spray mix within the first several minutes after its deposition on the furnace wall. Therefore, one method of evaluating the tendency of a spray mix composition to slump is to evaluate its viscosity by well-known means.

It has long been recognized in the art that used linings from basic metallurgical furnaces, such as basic oxygen vessels, provide an inexpensive source of magnesia grain for gunning compositions. However, such used refractory bricks are usually discarded and have not been widely used as a source of gunning composition magnesia grain because of the lack of a good binder system.

Therefore, there is a need for a binder which can be added to crushed, used refractory bricks from basic oxygen vessels to provide a gunning composition which can be formed into a wet spray mix with the following properties:

1. minimal rebound;
2. good low temperature strength;
3. good high temperature strength; and
4. no slumping.

One measure of strength of a refractory spray mix at various temperatures, as is well known, is the characteristic referred to as modulus of rupture (MOR). A good gunning composition should result in a spray mix with high modulus of rupture at low temperature, high modulus of rupture at high temperature, and good adherence characteristics.

SUMMARY OF INVENTION

We have discovered by combining both solid forms of water-soluble silicates, i.e. hydrated and anhydrous sodium slicate, in a critical combination with crushed magnesia refractory grains from used basic oxygen vessel linings, that a dry-nozzle gunning composition can be provided to produce a spray mix having the following characteristics:

1. good initial adherence—minimal rebound;
2. good low temperature strength (MOR);
3. good high temperature strength (MOR); and
4. no slumping, because the wet spray mix exhibits an increasing viscosity.

We prefer the complex binder to be present in the range between 2% to 14% of the total weight of the refractory composition, and that equal amounts are present of both hydrated and anhydrous sodium silicate. The preferred and broad ranges of the composition are listed in Table I.

Table I

| | Preferred wt. %* | Broad Range wt. %* |
|---|---|---|
| Magnesia Refractory Grains | 90% | 78-97% |
| Anhydrous Solid Sodium Silicate | 3% | 1-7% |
| Hydrated Solid Sodium Silicate | 3% | 1-7% |
| Sodium Bentonite Clay | 4% | 1-8% |

*all weight percentages are expressed as weight percent of the total dry composition Sodium bentonite clay can be present as a plasticizer, as is well known.

By magnesia refractory grains, we mean refractory particles that are high in MgO content, which particles can be produced from burning natural magnesites, $MgCO_3$, or magnesium hydroxides that are extracted from sea water or inland brines.

Magnesia refractory grains can be supplied from crushed, used bricks from basic oxygen vessels but can also be supplied from crushed, unused, tarbonded, tar-tempered, or burned-impregnated magnesia brick, or from commercially pure magnesia grain. Table II lists the range of analysis of basic oxygen furnace brick which is useful as magnesia refractory grains in the inventive composition:

Table II

| | Preferred wt. % | Broad Range wt. % |
|---|---|---|
| MgO | 90.2 | 76-99 |
| $SiO_2$ | 1.5 | 0-6 |
| CaO | 2.9 | 1-13 |
| $Fe_2O_3$ | 1.1 | 0-3 |
| $Cr_2O_3$ | 0 | 0-2 |
| $Al_2O_3$ | 0.2 | 0-2 |
| C | 3.3 | 0-10 |

The preferred and broad particle range size distribution in the composition is shown in Table III.

Table III

| Tyler Mesh Size | Preferred % Distribution | Broad Range % Distribution |
|---|---|---|
| + 8 | 0 | 0-1 |
| − 8 + 10 | 4 | 0-4 |

Table III-continued

| Tyler Mesh Size | Preferred % Distribution | Broad Range % Distribution |
|---|---|---|
| − 10 + 14 | 5 | 4–9 |
| − 14 + 20 | 19 | 18–26 |
| − 20 + 100 | 50 | 45–55 |
| − 100 + 200 | 9 | 5–10 |
| − 200 | 12 | 10–15 |

DETAILED DESCRIPTION OF PREFERRED EMBODIMENT

Figure 1:
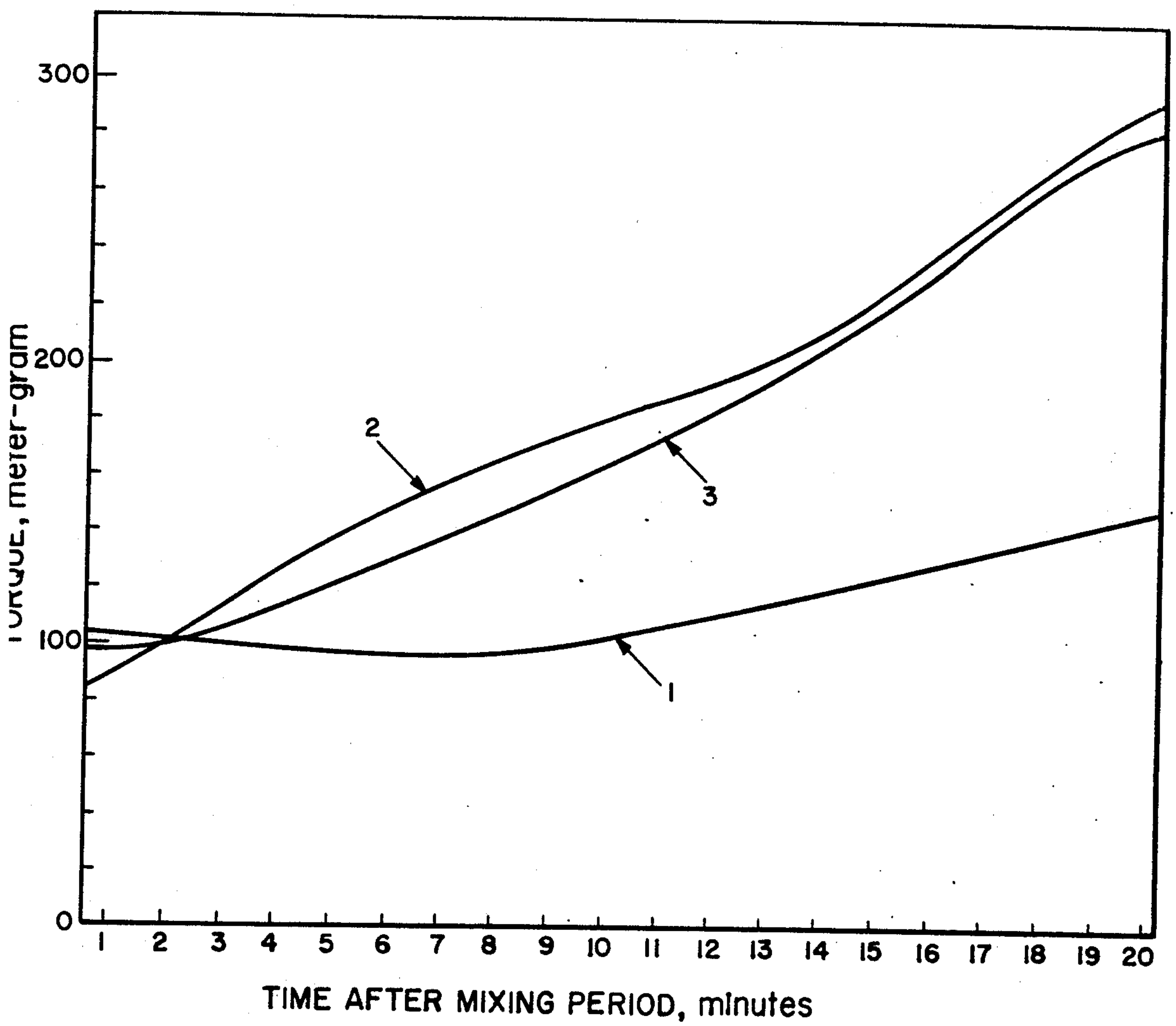
FIG. 1 shows a plot of the viscosity of a wet spray mix made from the inventive refractory composition and two wet spray mixes made from the same magnesia refractory grain but using prior art binders, such viscosity measured as torque resistance to the rotation of a rotating mixing head in a BRABENDER PLASTI-CORDER at a constant rate of shear.

By means of the following examples, the invention herein will be further described.

EXAMPLE 1

A first refractory composition was prepared by mixing refractory grains high in magnesia content from crushed, used basic oxygen vessel bricks with 4.7% by weight of the total composition of a binder of anhydrous sodium silicate particles and 3.8% by weight of the total composition of sodium bentonite clay. The anhydrous silicate particles had a molar ratio of $SiO_2$/$Na_2O$ of 3.32; a weight ratio of $SiO_2/Na_2O$ of 3.22; a $Na_2O$ weight content of 23.3%; a $SiO_2$ weight content of 75.0%; and 0% water. The particle size of the anhydrous silicate passed through 20 mesh. Such anhydrous sodium silicate is supplied by the Philadelphia Quartz Company under the registered trade mark "SS20".

A second refractory composition was prepared using the same BOF refractories and a binder of 4.7% by weight of the total composition of particles of hydrated sodium silicate and 3.8% by weight of the total composition of sodium bentonite clay. The sodium silicate had a molar ratio of $SiO_2/Na_2O$ of 2.06; a weight ratio of $SiO_2/Na_2O$ of 2.00; a $Na_2O$ weight content of 27%; a $SiO_2$ weight content of 54%; and 18.5% weight water. The particle size of the hydrated silicate was 80% through 100 mesh. A suitable hydrated sodium silicate powder is supplied by Philadelphia Quartz Company under the registered trade mark "GD".

A third composition, the composition of the invention, was prepared from the same BOF refractories of compositions 1 and 2 mixed with a binder consisting by weight of the total composition of 2.8% of the same anhydrous sodium silicate powder used in the first composition and 2.8% by weight of the same hydrated sodium silicate powder used in the second composition.

The analysis of the refractory brick used in the three compositions is listed in Table IV.

Table IV

| | |
|---|---|
| MgO | 90.2 |
| $SiO_2$ | 1.5 |
| CaO | 2.9 |
| $Fe_2O_3$ | 1.1 |
| $Al_2O_3$ | 0.2 |
| C | 3.3 |

Table V lists the size distribution of the particles of the three compositions.

Table V

| Tyler Mesh Size | % Distribution |
|---|---|
| − 10 + 14 | 8 |
| − 14 + 20 | 22 |
| − 20 + 100 | 49 |
| − 100 + 200 | 8 |
| − 200 | 13 |

The modulus of rupture for each composition was determined according to the following procedure:

About 315 grams of each composition were mixed to form a wet composition having a water content of about 5.6% by weight, each composition pressed into a green bar 1×1×7 inches, using a pressure of 4000 psi. The green bars were dried in air for 24 hours, followed by 24 hours at 220° F., and then trimmed to a 1×1×6 inch bar. Each bar was placed in a furnace and mounted on two bearing edges which contacted the bottom surface of the bar at approximately ½ inch from each end. The bearing edges had a radius of curvature of ½ inch. The bars were heated to temperature at a rate of 100° F./hr. A Tinius Olsen screw-driven, controlled, strain-rate test machine applied a force on the top surface of the bar at its midpoint, using a bearing block with a ½ inch radius, at a loading rate of 150 lbs/min. After the bar broke, the MOR was calculated using the following equation:

$MOR = 7.5 \times load/bd^2$ b = sample width at break d = sample thickness at break This procedure is familiar to one skilled in the art of refractory brick testing.

Table VI lists the modulus of rupture at various temperatures of the inventive composition and the two compositions using prior art binders.

Table VI

| | MOR, PSI | | |
|---|---|---|---|
| Temperature °F. | Comp. 1 | Comp. 2 | Invention |
| 70° F. | 260 | 1750 | 950 |
| 2200° F. | 110 | 240 | 190 |

Table VI indicates that the anhydrous sodium silicate binder, composition 1, results in a composition which is unsuitable due to a low modulus of rupture at low temperatures. Such low modulus of rupture would indicate low strength of the composition as it sets up, and would be undesirable in a furnace. The hydrated sodium silicate binder, composition 2, results in a composition having a high MOR at both low and high temperatures, as did the complex binder of the inventive composition.

EXAMPLE 2

A conventional rotational viscometer, referred to as a torque rheometer, was used to determine the flowability of wet spray mixes made from the three compositions in Example 1 according to the following technique:

Approximately 3240 grams of each mix was mixed with water, to produce a mixture having a water content of 19% by weight, using a torque rheometer, known under the trademark as BRABENDER PLASTI-CORDER, equipped with a planetary mixing head. The BRABENDER PLASTI-CORDER is supplied by C. W. Brabender Instruments, Inc. The water and dry composition were mixed for 2½ minutes to assure thorough mixing. Thereafter, as the head continued to rotate, readings were taken for twenty minutes. The sample was maintained at a constant temperature of 23° C. and the rate of rotation of the mixing head kept constant at 30 RPM.

The BRABENDER PLASTI-CORDER as is well known, can be used to measure the resistance that a viscous fluid presents to the rotation at a constant RPM of a paddle immersed in such fluid. The resistance is recorded as torque in meter-grams and can be said to be an indication of the viscosity of the fluid at a constant rate of shear. The use of the BRABENDER PLASTI-CORDER to measure viscosity is well known, and described in the book "Viscosity and Flow Measurement, a Laboratory Handbook of Rheology", by J. R. VanWazer, J. W. Lyons, K. Y. Kim, and R. E. Colewell, John Wiley and Sons, 1966, Pages 314–318. When we use the term viscosity herein, we mean the characteristic measured as torque, which torque is needed to overcome the resistance to the rotation of the rotating mixing head in the BRABENDER PLASTI-CORDER at a constant RPM, or rate of shear.

FIG. 1 shows that a wet spray mix made from the hydrated sodium silicate binder composition had a viscosity, curve 1, which decreased for the first several minutes after mixing with water, indicating a tendency toward slumping. This tendency was borne out in actual gunning tests on operational electric arc furnaces as hereinafter described. Curve 2 shows that a wet spray mix made fom anhydrous sodium silicate binder composition increased in viscosity, indicating a resistance toward slumping. Curve 3 shows that a wet spray mix made from the inventive composition had a viscosity which increased with time, and was almost equal to the viscosity of the wet spray mix using anhydrous sodium silicate binder. Curve 3 would indicate also that a wet spray mix made from the inventive composition should resist slumping, a characteristic proven to be true in gunning tests.

Thus, it can be seen that the critical combination in the binder of particles of hydrated and anhydrous sodium silicate can supply to a magnesia grain refractory composition spray mix the desired properties which neither silicate binder, if used alone, can supply, i.e. good low temperature strength, good high temperature strength, good initial adherence, and a resistance toward slumping, due to an increasing viscosity in the wet spray mix.

EXAMPLE 3

One-thousand pound batches of compositions 1, 2, and the invention were prepared and dry-nozzle gunned onto the refractory walls of electric arc and basic oxygen furnaces, using well known techniques and equipment. The furnaces were lined with 60–40 magnesia-chrome brick and 95% magnesia brick respectively, and the wall temperatures were at about 1500° F. to 2000° F. The compositions were gunned through a Ridley batch-type pneumatic gun and were mixed at the nozzle with conventional amounts of water, in the range of 8% to 19% by weight of the wet spray mix gunning composition.

The gunning trials confirmed that the inventive composition had minimal rebound and did not slump, while the hydrated sodium silicate composition had slumping problems. The anhydrous sodium silicate composition did not have a rebound or slumping problem but as stated above, its low temperature MOR would make it undesirable for use, as stated in Example 1, and the composition did not hold well in the furnace. Gunning trials indicated too many fines in the composition, and the preferred range of the composition was adjusted to include more large particles and fewer fines, as is well known.

Table VII lists the typical chemical analysis of the composition of this invention, but it should be recognized that the composition will vary somewhat as the range of constituents varies within the broad permissable range of the invention. The analyses of mineral components are reported in the usual manner, expressed as simple oxides, e.g., $Na_2O$, MgO, $SiO_2$, although the components may actually be present in various combinations, e.g. as sodium silicate hydrated with water, and anhydrous sodium silicate.

Table VII

| | |
|---|---|
| MgO | 78.6% |
| $SiO_2$ | 8.3% |
| CaO | 4.3% |
| $Fe_2O_3$ | 2.2% |
| $Cr_2O_3$ | 0.24% |
| $Al_2O_3$ | 0.97% |
| $Na_2O$ | 1.3% |
| C | 2.4% |

Mesh sizes referred herein are Tyler standard screen sizes which are defined in Chemical Engineers Handbook, John H. Perry, Editor-in-Chief, 3rd Edition, 1950, published by McGraw-Hill Book Company, at page 963.

While the composition of this invention is disclosed as being useful in the repair of electric arc furnaces and basic oxygen vessels, such composition could be used on other types of metallurgical vessels which have refractories that are compatible with the magnesia grain in the composition.

We claim:

1. A refractory gunning composition consisting essentially of magnesia refractory grains, about 1 to 8% by weight of the total composition of a plasticizer clay and about 2 to 14% by weight of the total composition of a binder consisting essentially of a mixture of particles of anhydrous sodium silicate and hydrated sodium silicate, said composition having a maximum of 5% of its particles larger than 10 mesh Tyler and between 10 to 15% of its particles smaller than 200 mesh Tyler, said composition characterized by an increasing viscosity when sprayed as a wet spray on a refractory wall, said composition after being mixed with water and dried having a Modulus of Rupture of at least 190 psi at 2200° F. and at least 950 psi at 70° F.

2. The composition of claim 1 in which said anhydrous sodium silicate particles and said hydrated sodium silicate particles are present in approximately equal amounts.

3. The composition of claim 2 in which said refractory grains are crushed, basic oxygen vessel refractory brick having an analysis consisting essentially of by weight:

MgO: 76–99
$SiO_2$: 0–6
CaO: 1–13
$Fe_2O_3$: 0–3
$Cr_2O_3$: 0–2
$Al_2O_3$: 0–2
C:0–10.

4. The composition of claim 3 in which said plasticizer is sodium bentonite clay.

5. The composition of claim 4 in which said anhydrous sodium silicate has a molar ratio of $SiO_2/Na_2O$ of 3.32; an $Na_2O$ weight content of 23.3%; an $SiO_2$ weight content of 75.0%; an $H_2O$ weight content of 0%, and a particle size passing through 20 mesh.

6. The composition of claim 5 in which said hydrated sodium silicate has a molar ratio of $SiO_2/Na_2O$ of 2.06; and $Na_2O$ weight content of 27%; an $SiO_2$ weight content of 54%; an $H_2O$ weight content of about 18.5%, and a particle size 80% through 100 mesh.

7. The composition of claim 6 in which said composition has a Tyler mesh particle size of +8, 0 to 1%; −8+10, 0 to 4%, −10+14, 4 to 9%, −14+20, 18 to 26%; −20+100, 45 to 55%; −100+200, 5 to 10%; and −200, 10 to 15%.

8. The method of making refractory repairs which comprises:

(a) providing a gunning composition consisting essentially of magnesia grains, sodium bentonite clay between 1% and 8% by weight of the total composition, a binder between 2% and 14% by weight of the total composition, said binder consisting essentially of a mixture of particles of anhydrous sodium silicate and hydrated sodium silicate, said composition having a maximum of 5% of its particles larger than 10 mesh Tyler and between 10 to 15% of its particles smaller than 200 mesh Tyler;

(b) discharging said composition through a nozzle of a spray gun;

(c) mixing water with said composition at the nozzle to form a wet spray mix having a water content of between 8% and 19% by weight of the spray mix, and an increasing viscosity; and (d) depositing said wet spray mix onto a refractory base and drying said deposited wet spray mix to form a composition having a Modulus of Rupture of at least 190 psi at 2200° F. and at least 950 psi at 70° F.

* * * * *